March 30, 1926.
J. A. DEDOUCH
1,578,406
MEDALLION MOUNTING
Filed March 25, 1925   2 Sheets-Sheet 1
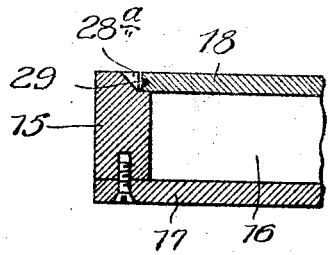
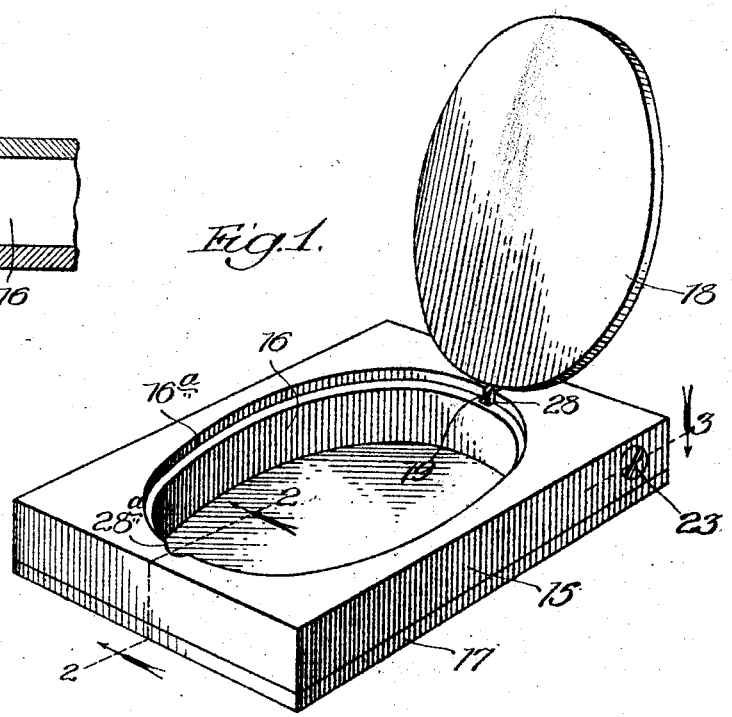
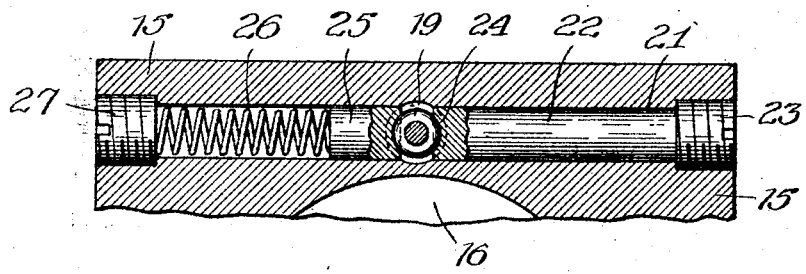
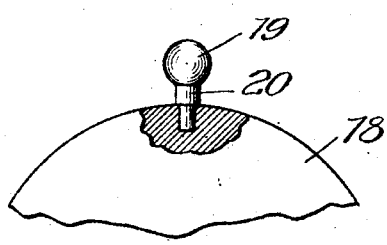

March 30, 1926.
J. A. DEDOUCH
1,578,406
MEDALLION MOUNTING
Filed March 25, 1925    2 Sheets-Sheet 2
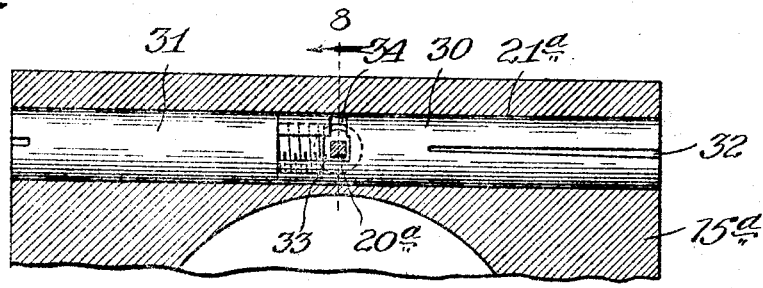
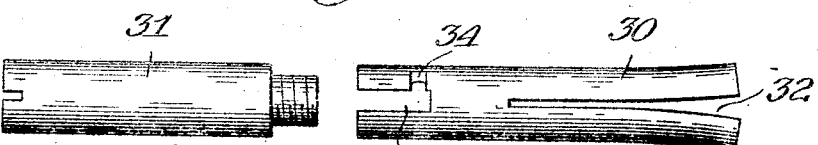
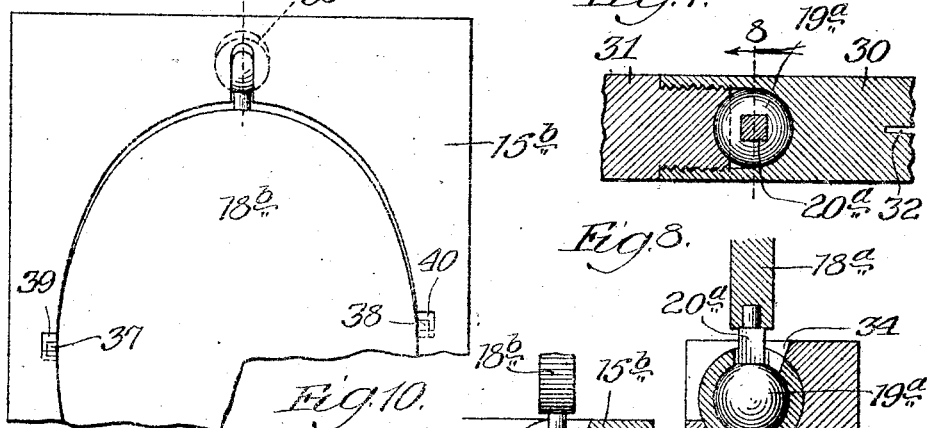
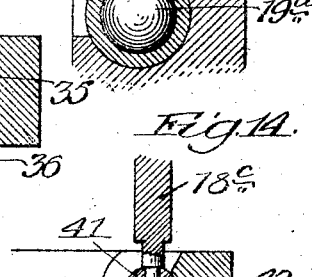
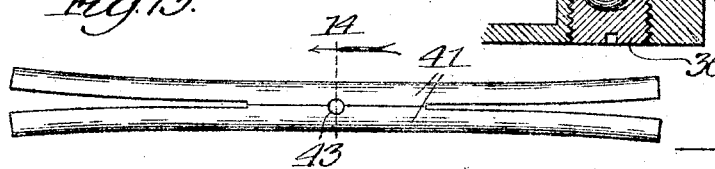
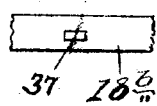
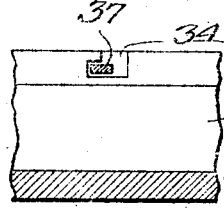
Inventor:
Joseph A. Dedouch,
By Dyrenforth, Lee, Chritton & Wiles
Attys.

Patented Mar. 30, 1926.

1,578,406

UNITED STATES PATENT OFFICE.

JOSEPH A. DEDOUCH, OF OAK PARK, ILLINOIS.

MEDALLION MOUNTING.

Application filed March 25, 1925. Serial No. 18,135.

*To all whom it may concern:*

Be it known that I, JOSEPH A. DEDOUCH, a citizen of the United States, residing at Oak Park, in the county of Cook and State of Illinois, have invented a new and useful Improvement in Medallion Mountings, of which the following is a specification.

This invention relates to mountings for medallions and the like and is fully described in the following specification and shown in the accompanying drawings in which—

Figure 1 is a perspective view of one form of the mounting showing the cover raised;

Fig. 2 is an enlarged partial section on the line 2—2 of Fig. 1;

Fig. 3 is a similar view on the line 3 of Fig. 1;

Fig. 4 is a detailed view of the ball mounting;

Fig. 5 is a view similar to Fig. 3 but showing a modified form of the device;

Fig. 6 is a detailed view of the tubular elements shown in Fig. 5;

Figs. 7 and 8 are further detailed views of the ball and socket arrangement shown in Fig. 5;

Fig. 9 is a partial top plan view of a modified form of the mounting;

Fig. 10 is an enlarged partial section on the line 10 of Fig. 9;

Figs. 11 and 12 are further details of this latter construction;

Figs. 13 and 14 are details of still another modified form of the device shown in Fig. 1.

The embodiment shown in Figs. 1 to 4 comprises a base 15 having an opening 16 which is preferably closed at the bottom as by means of the plate 17. A cover 18 is provided for this opening which is preferably elliptical in form and has a ball 19 with a reduced neck 20 which is secured to the cover 18 by any suitable means as abrasing.

A hole 21 is preferably drilled through the base 15 as shown in Fig. 3 near one end of the opening 16. A plug 22, having a screw threaded end 23, is screwed into the hole 21 from the right hand side and this has a cup-like depression 24 at one end to receive the ball 19. This is so placed that when the plug 22 is inserted and the ball 20 placed against it, the ball will bring the cover 18 into position to be thrown over into position to close the top of the opening 16 as will later be explained. A plunger 25 is pressed against the opposite side of the ball 19 by means of a spring 26 which is adjustably held by means of a threaded screw 27.

A notch 28 is cut in the upper portion of the base 15 so as to permit the neck 20 to pass as the cover 19 is lowered from the position shown in Fig. 1 until it lies within the upper portion of the opening 16. A ledge 16ª is preferably placed about the upper portion of the opening 16 so that the cover 18 will fit into it and remain substantially flush with the upper portion of the base 15. For convenience in raising the cover, a slot 28 is formd in the base and a notch 29 in the end of the cover as is shown in Fig. 2.

A medallion or picture of any kind may be placed upon one face of the cover 18 and any appropriate inscription, emblem or the like, upon the opposite face. Thus the portrait of an individual may be used and the cover turned so that when folded down to the closed position the portrait will be enclosed within the mounting while whatever is placed upon the opposite side of the cover will remain exposed. Thus the opening 16 serves also the purpose of a jewel case or the like and, when the cover is raised, it serves as a mounting for a portrait.

If desired, however, the cover 18 may be turned about its major axis so that when the cover is again closed the portrait will remain exposed upon the top of the mounting. The spring 26 is of sufficient stiffness to apply enough pressure through the plunger 25 upon the ball 19 to enable the cover to remain stationary at any position in which it is placed.

In Figs. 5 to 8 is shown a modification of the device in which the hole 21ª is preferably drilled straight through the base 15ª and pins 30 and 31 are inserted therein which are screw threaded so that one screws into the other as shown in Fig. 7, leaving a nearly spherical surface therebetween which serves as a socket for the ball 19ª. The pin 30 is of spring metal and is split at 32 so as to provide a friction means for preventing the pin 30 from readily turning within the hole 21ª.

The neck 20ª of the ball 19ª is square but may be turned within the enlarged slot 33 when the pin and neck 28 are in the position shown in Fig. 5, thereby permitting the cover 18ª to be reversed as has previously been explained. A lateral extension 34ª from the notch 33 is of the same width as the neck 20ª.

As the cover is brought down into closed position the neck 20ª will bear against the lower side of the slot 33 and will cause the pin 30 to rotate. When, following this, the cover is again raised, the pin 30 will not move until the neck 20ª strikes the upper portion of the slotted extension 34. Any further opening movement then of the cover 18ª will cause the pin 30 to rotate. During the time the neck 20ª is within the slotted extension 34 which it substantially fits, the cover will be prevented from turning. To turn the cover therefore it is necessary to again rock it forward until the neck portion 20ª again passes into the larger slot 33 when the cover may be turned so as to bring either face to the front. By making the screw 31 a tight fit within the pin 30 and a fairly loose fit within the drilled hole 21ª, the rocking of the pin 30 will have little tendency to unloosen the screw 31.

In Figs. 9 to 12 is shown a still further modification of the device in which the base 15ᵇ is adapted to be held in a vertical position as upon the vertical face of a tombstone. In this case one face of the cover 18ᵇ carries preferably upon its outer face an inscription and upon its inner face a portrait, generally in enamel, so that it is substantially a proof against the action of the elements. The cover 18ᵇ has a ball 19ᵇ which is rotatable within a suitable socket 35 in the base 15ᵇ and is loosely held therein by means of a screw threaded member 36. The socket 35 is slightly elongated so as to permit slight, vertical movement of the ball therein. Lugs 37 and 38 are screwed to the sides of the cover 18ᵇ but at different elevations, each being adapted to fall within its own pocket 39 and 40 when the cover is lowered with one face exposed. When, however, the reverse face is exposed, neither lug will fall within its own pocket and consequently the cover will not close as before. The pockets 39 and 40 are slightly notched as shown in Fig. 9 so that in replacing the cover it is raised somewhat, the lugs forced into place and the cover lowered. Thus the chance of the wrong face being left exposed is very greatly lessened.

In Figs. 13 and 14 is shown a still further modification which in general is more nearly like Fig. 5, the yieldable pins 41 being adapted to fit the drilled hole 21ª of that construction. A pin 42 is screwed to the cover 18ᶜ and passes through an opening 43 which lies half in each of the pins 41. The pin 42 is of such a size that when the pins 41 are forced into the hole 21ª the spring action of these pins will grip the pin 43 so that force will be required to turn it. Thus it will be obvious that a ready means is provided whereby the cover 18ᶜ may be turned either about its major axis and that of the pin 42 or about the axis of the two semi-cylindrical pins 41 and that it will remain in whatever position it is placed.

While I have shown and described but a few embodiments of my invention, it is to be understood that it is capable of many modifications. Changes therefore in the construction and arrangement may be made which do not depart from the spirit and scope of my invention as covered by the appended claims.

I claim:

1. In a mounting for medallions and the like, a base, an opening therein, an elliptical cover hingedly secured to said base and adapted to fold into said opening, said cover being reversible without removal of said hinge so as to cause either side to fold into said opening.

2. In a mounting for medallions and the like, a base, an opening therein, a cover having a ball adapted to rotate in a socket in said base, said ball lying on an axis about which the cover is symmetrical whereby the cover may be folded down so that either face of the cover lies within the opening in the base.

3. In a mounting for medallions and the like (a base, an opening therein, a cover hingedly secured to said base and adapted to fold into said opening, said cover being reversible so as to cause either side to fold, and means for applying pressure to said hinge means to enable the cover to stand in any position in which it is placed.

4. In a mounting for medallions and the like, a base, an opening therein, a cover having a ball secured thereto and lying on an axis thereof, a hole in said base adjacent said opening, and means in said hole for yieldably gripping said ball to enable said cover to be folded into said opening and to stand at any angle at which it is placed.

5. In a mounting for medallions and the like, a base, an opening therein, a cover having a ball secured thereto and lying on an axis thereof, a hole in said base adjacent said opening, and members inserted from opposite ends in said hole for yieldably gripping said ball to enable said cover to be folded into said opening.

In testimony whereof I have hereunto set my hand this 7th day of March, 1925.

JOSEPH A. DEDOUCH.